United States Patent [19]

Funada

[11] Patent Number: 4,730,294
[45] Date of Patent: Mar. 8, 1988

[54] OPTICAL INFORMATION-RECORDING/REPRODUCING APPARATUS WITH CANCELLATION FOR OFFSET CONTAINED IN ERROR SIGNAL

[75] Inventor: Saburo Funada, Tokyo, Japan

[73] Assignee: Olympus Optical Co., Ltd., Tokyo, Japan

[21] Appl. No.: 910,955

[22] Filed: Sep. 24, 1986

[30] Foreign Application Priority Data

Oct. 1, 1985 [JP] Japan .................. 60-218862

[51] Int. Cl.$^4$ ............................. G11B 7/00
[52] U.S. Cl. ............................. 369/46; 369/124
[58] Field of Search .......... 369/44, 45, 46, 59, 369/124; 250/201

[56] References Cited

U.S. PATENT DOCUMENTS

| | | | |
|---|---|---|---|
| 4,541,084 | 9/1985 | Oku et al. | 369/45 |
| 4,633,453 | 12/1986 | Ogawa | 369/44 |
| 4,639,907 | 1/1987 | Aoki et al. | 369/45 |
| 4,663,751 | 5/1987 | Kaku et al. | 369/46 |

*Primary Examiner*—Donald McElheny, Jr.
*Attorney, Agent, or Firm*—Frishauf, Holtz, Goodman & Woodward

[57] ABSTRACT

An optical information-recording/reproducing apparatus comprises a beam-irradiator for irradiating a beam to an optical information-recording medium having a pre-format portion containing an address signal, and a data portion including an area in which information signals are to be recorded, a reflected-beam detector for producing an electric signal corresponding to the reflected beam from the recording medium, an error-signal detector for detecting an error signal for tracking control and/or focussing control of the beam, based on the electric signal, an information signal detector for detecting an information signal to be recorded in the data portion of the recording medium, based on the electric signal, a pre-format portion detector for detecting the pre-format portion of the recording medium, based on the electric signal, an offset-canceller for overlapping the error signal from the error signal detector and a compensation signal corresponding to the substantial difference of DC offset components between the data portion and pre-format portion detected by the pre-format detector and a controller for controlling tracking and/or focussing of the beam, based on a signal which is generated when the DC offset components contained in the error signal are compensated by said offset canceller.

5 Claims, 10 Drawing Figures

F I G. 3A
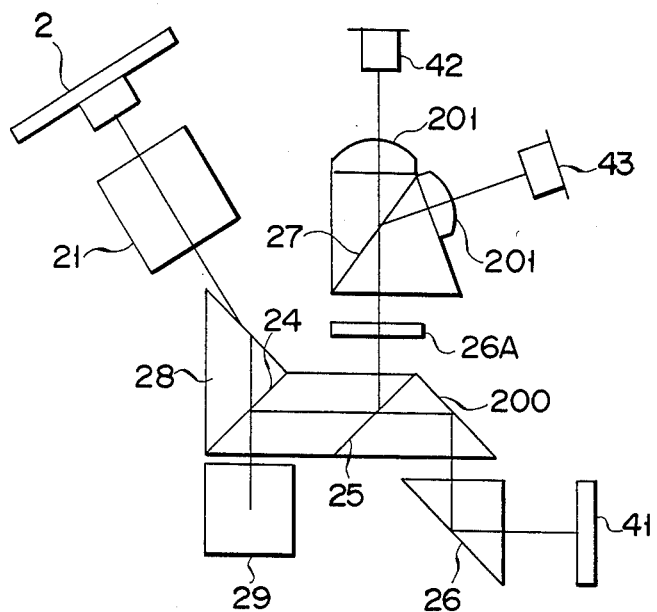
F I G. 3B
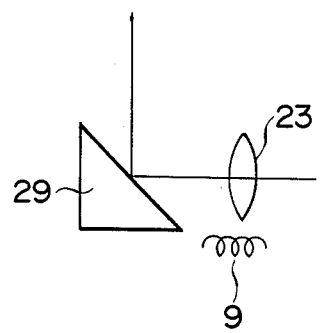

F I G. 5A
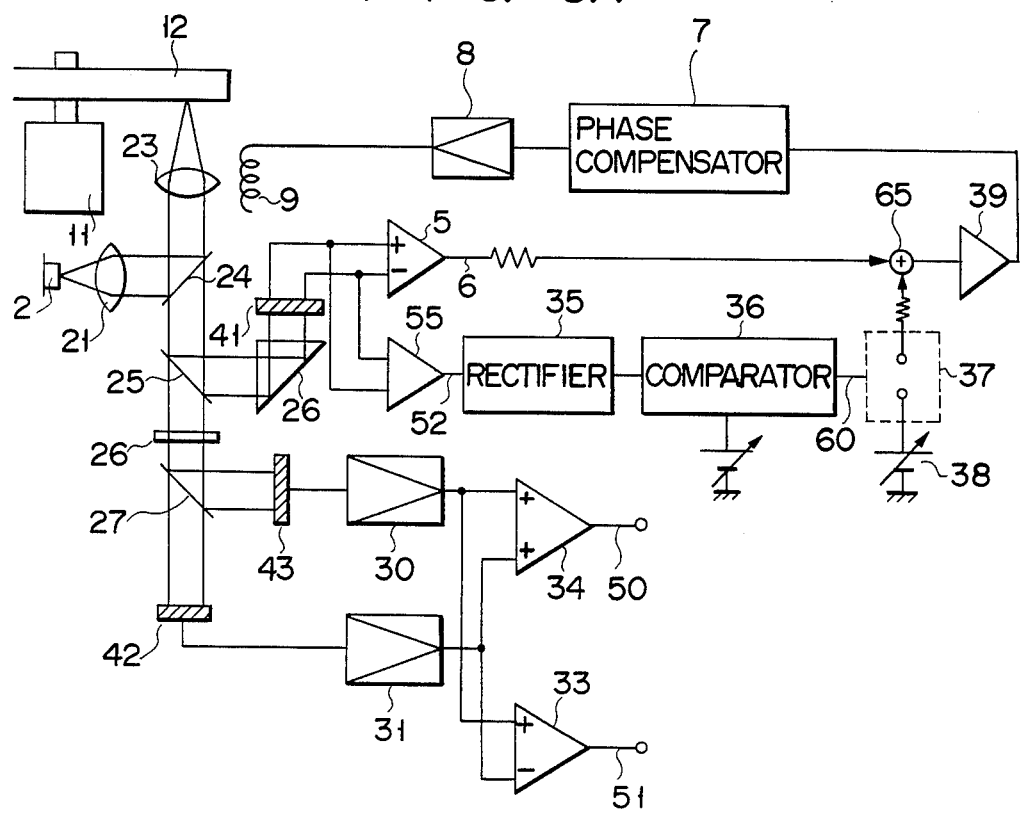
F I G. 5B
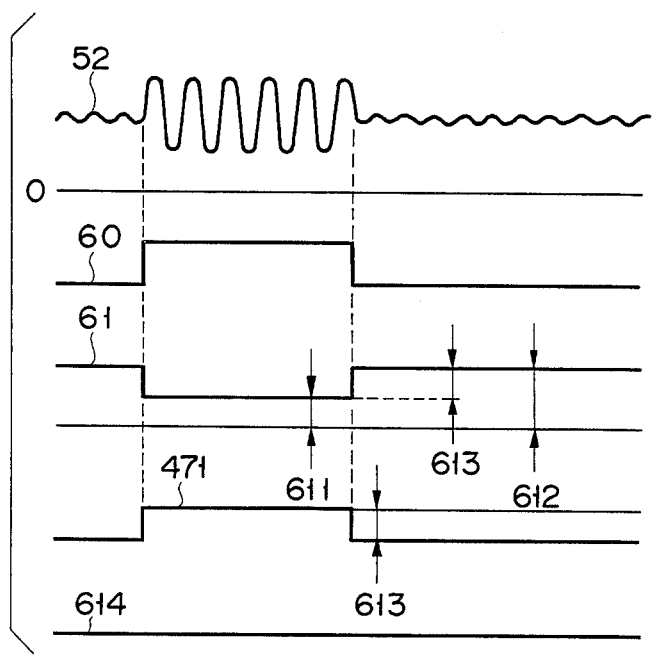

OPTICAL INFORMATION-RECORDING/REPRODUCING APPARATUS WITH CANCELLATION FOR OFFSET CONTAINED IN ERROR SIGNAL

BACKGROUND OF THE INVENTION

This invention relates to an optical information-recording/reproducing apparatus with cancellation for an offset contained in an error signal, and more particularly, to an optical information-recording/reproducing apparatus suitable for, for instance, an optical disc device or an optical magnetic disc device which records, reproduces, erases, and rewrites information by irradiating a beam to the information-recording medium (hereinafter called a disc).

Generally, in an optical disc device or an optical magnetic disc device, each concentric or spiral track on a disk is divided into plural sectors per circle, to form the pre-format portion for use as the address index, and the recording, reproduction, erasing, and rewriting of information are made in the data portion, i.e., the portion other than the pre-format portion. For reasons of workability, etc., such a pre-format portion is usually provided by opening pits (a dented or hollow portion) in advance (pre-pits) in the disc, by means of a pressing or stamping method. However, in an error signal, i.e. a focus-error signal (FES) or a track-error signal (TES), obtained by detecting the return beams coming from the disc provided with such a pre-format portion as in the above method, there appears the phenomenon of the different DC offset components of the pre-format portion and the data portion overlapping each other. Such overlapping of the different DC offset parts is observed during the recording operation of a draw-type optical disc and during both the recording and reproduction operations of an optical magnetic disc.

FIGS. 1(A) and 1(B) show the above-mentioned relations in the prior art; FIG. 1(A) shows the construction of the closed servo-loop for tracking control of an optical disc device, and FIG. 1(B) illustrates the conditions of the DC-offset error signal in the servo-loop. In FIG. 1(A), numeral 1 denotes a disc which rotates by means of spindle motor 11. The laser beam from semiconductor laser 2 is irradiated to disc 1 by means of collimeter lens 21, half-mirror 22, and object lens 23. Numeral 4 shows a 2-or 4-split beam detector for detecting the return beams, whose output signal is input to differential amplifier 5, to obtain error signal 6. Error signal 6 is input to coil 9 in an actuator (not shown), via phase-compensator circuit 7 and driving-circuit 8 for driving the beam-moving means. This moves object lens 23 and thus controls the beams. Error signal 6 (obtained by means of detection by beam detector 4) of the return beam returned from optical disc 1, now has DC-offset components which differ between the pre-format portion and the data portion. FIG. 1(B) shows a diagram illustrating the conditions of the DC-offset components at the pre-format portion and the data portion, wherein numeral 61 shows the DC offset, 611 the offset at the pre-format portion, and 612 the offset at the data portion. In the above closed servo-loop, however, error signal 6 having the offset moves object lens 2 by means of coil 9 via driving circuit 8, and the loop makes the control so as to electrically compensate for error signal 6, which is the output from differential amplifier 5, to reduce it to zero. Then the error signal becomes as shown by numeral 62 in FIG. 1(B), and as a result, the actual beams will be subjected to tracking control at a point off from the ideal central position on the track, to the extent that the offset is cancelled. The same is true in the case of the focus-error signal, in which focussing control will be performed by the actual beam defocussed off the disc.

Regarding such a change of offset in the error signals, the applicant of this invention once proposed the idea of constantly controlling such change based on a write gate signal, during the time when information is recorded in an optical disc device, to ensure a stable and reliable writing operation.

According to the prior art shown in FIG. 1(A), however, the change of offset contained in the error signals is electrically compensated for, by the closed servo-loop, so as to control the actual beams at a defocussed or off-track position. Further, the above-mentioned method of making the offset constant, based on the write gate signal only during the recording time, is ineffective in the case of an optical magnetic disc which is largely affected by the offset of the error signals at reproduction time, too. As a result, the prior art has the problem that normal tracking and focussing are impossible at the recording or reproduction time, thus worsening the error rate when performing the information processing.

SUMMARY OF THE INVENTION

It is therefore an object of the present invention to provide a new and improved optical information-recording/reproducing apparatus with cancellation for an offset contained in an error signal, which can resolve the above problems of the prior art and improve the information-processing reliability during the information-recording/reproduction time, etc.

According to the present invention, there is provided an optical information-recording/reproducing apparatus with cancellation for an offset contained in an error signal, the apparatus comprising:

beam-irradiation means for irradiating a beam to an optical information-recording medium having a pre-format portion containing an address signal and a data portion including an area in which information signals are to be recorded;

reflected beam-detection means for producing an electric signal corresponding to a reflected beam from the optical information-recording medium irradiated by the beam-irradiation means:

error-signal detection means for detecting an error signal for tracking and/or focusing control of the beam, based on the electric signal from the reflected beam-detection means;

information-signal detection means for detecting the information signal to be recorded in the data portion of the optical information-recording medium, based on the electric signal from the reflected-beam detection means;

pre-format portion detection means for detecting the pre-format portion of the optical-information recording medium, based on the electric signal from the reflected-beam detection means;

offset-cancellation means for overlapping the error signal from the error-signal detection means and a compensation signal corresponding to the substantial difference of DC offset components between the data portion and the pre-format portion detected by the pre-format portion detection means; and control means for controlling tracking and/or focussing of the beam, based on a signal which is generated when the DC offset components contained in the error signal are compensated by the offset-cancellation means.

BRIEF DESCRIPTION OF THE DRAWINGS

These and other objects and features of the present invention can be understood with reference to the accompanying drawings, in which:

FIGS. 3(A) and 3(B) show the construction of another optical magnetic pick-up embodied according to this invention;

FIGS. 5(A) and 5(B) show the construction of the third embodiment according to this invention and illustrate its waveform.

DETAILED DESCRIPTION OF THE PREFERRED EMBODIMENTS

Some preferred embodiments according to this invention will hereinafter be described in reference to the accompanying drawings.

Figure 1A:
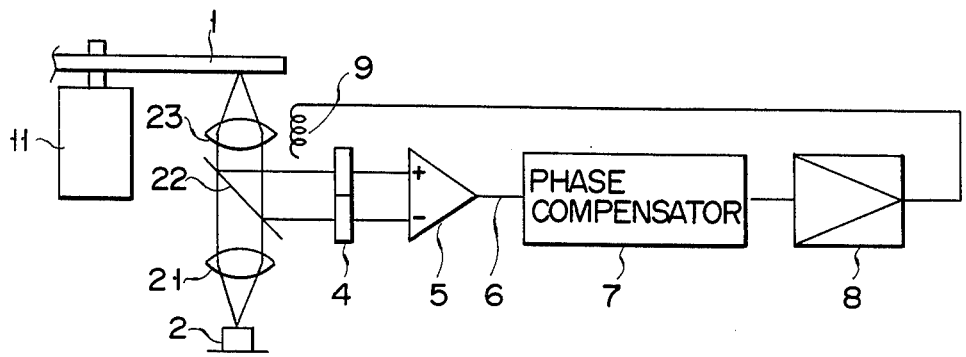
FIGS. 1(A) and 1(B) show the construction of the prior art and illustrate its waveform.
Figure 1B:
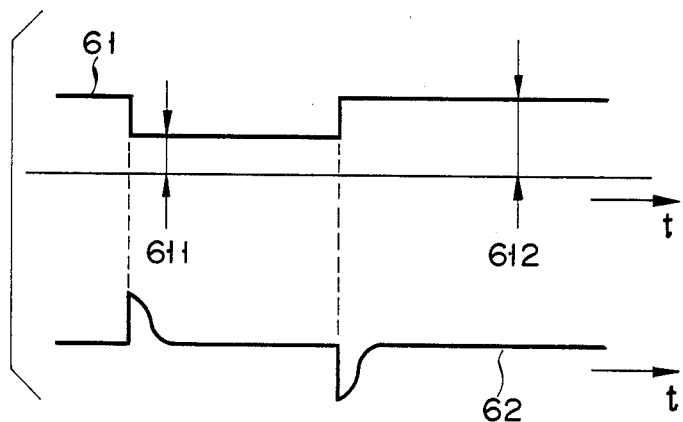
Figure 2A:
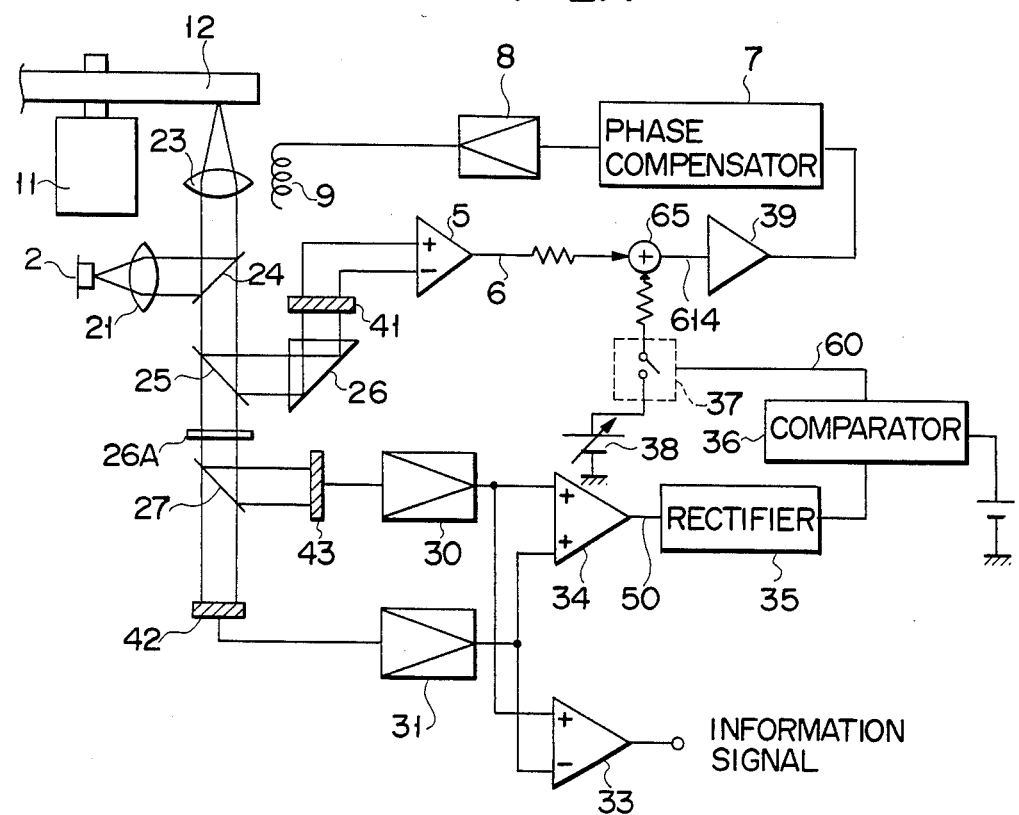
FIGS. 2(A) and 2(B) show the construction of the first embodiment according to this invention and illustrate its waveform.

FIG. 2(A) shows the construction of the main parts of an optical magnetic disc device as the first embodiment according to this invention. Numeral 12 shows an optical magnetic disc which is pre-formatted with pre-pits. The magnetic field applying means is omitted. The beams from semiconductor laser 21, which have been made parallel by collimeter lens 21, are reflected by beam splitter 24 and concentrated on disc 12 through the object lens 23. The return beams returning from disc 12 pass through object lens 23 and beam splitter 24, partially reflect on beam splitter 25, reflect again on critical angle prism 26 and then enter photoelectric detector 41 for the control. The output from this detector 41 makes error signal 6 by differential amplifier 5.

On the other hand, the light flux which passed through beam splitter 25 passes through ½λ plate 26A, is split into two by polarized beam splitter 27 and each undergoes photoelectric conversion at photoelectric detectors 42 and 43. The photoelectric conversion outputs from detectors 42 and 43 are amplified by amplifiers 30 and 31 and then input to differential amplifier 33. The subtract output from amplifier 33 has become the information signal on optical magnetic disc 12.

On the other hand, the outputs from amplifiers 30 and 31 are also input to operation amplifier 34 and its add output 50 is applied to analog switch 37 through rectifier 35 and comparator 36. Analog switch 37 opens/closes according to add output 50 and makes the compensation signal from compensation signal source 38 overlap the error signal (TES or FES) through adder 65. Amplifier 39 supplies coil 9 in the actuator with signal 614 resulting from the compensation of the offset contained in error signal 6, which compensation is made by the compensation signal from compensation signal source 38 overlapping error signal (TES) 6. This moves object lens 23 to control the beams.

Figure 2B:
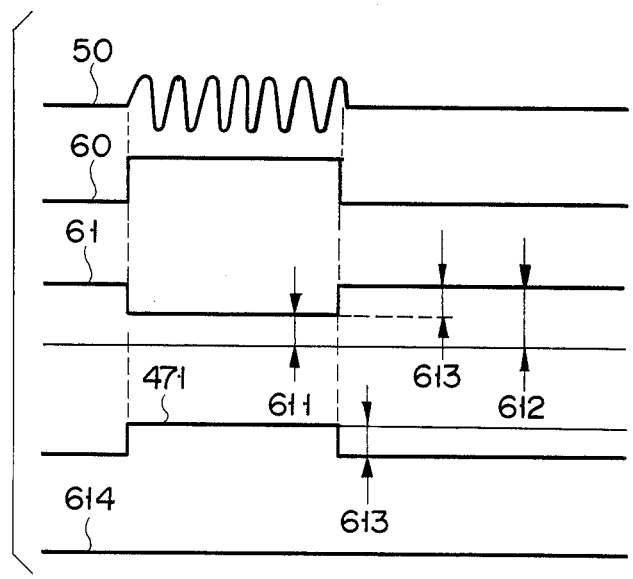

FIG. 2(B) shows typical waveforms illustrating the operation of this invention. Add output 50 from operation amplifier 34 detects the pre-format part of the disc and becomes the signal shown in the figure. Add output 50 passes through rectifier 35 and comparator 36 and becomes output 60. On the other hand, error signal 60 has DC offset 60, which differs at the pre-format part (611) and the other part (612) and has difference 613 between them. According to output 60, analog switch 37 causes adder 65 to add compensation signal 471 to error signal 6 and produces signal 614 which has compensated the offset contained in the error signal.

FIGS. 3(A) and 3(B) show an optical magnetic pickup, another embodiment according to this invention. The same numbers as in FIG. 2(A) are given to the members used in FIG. 2(A). This embodiment will be explained below only about the different parts not used in FIG. 2(A). FIG. 3(A) mainly shows the construction of the pick-up proper and FIG. 3(B) that of the actuator.

Rectifying prism 28 in FIG. 3(A) is provided in order to correct the elliptic beams into circular ones. Mirror 29 reflects the laser beams from semiconductor laser 2 vertically to and upward from the paper, and leads them to the actuator containing object lens 23 and coil 9, as shown in FIG. 3(B). Mirror 200 reflects the light transmitted by beam splitter 25 and makes it enter critical angle prism 26. Condensing lens 201 condenses the lights split by polarized beam splitter 27 on detectors 42 and 43.

Figure 4A:
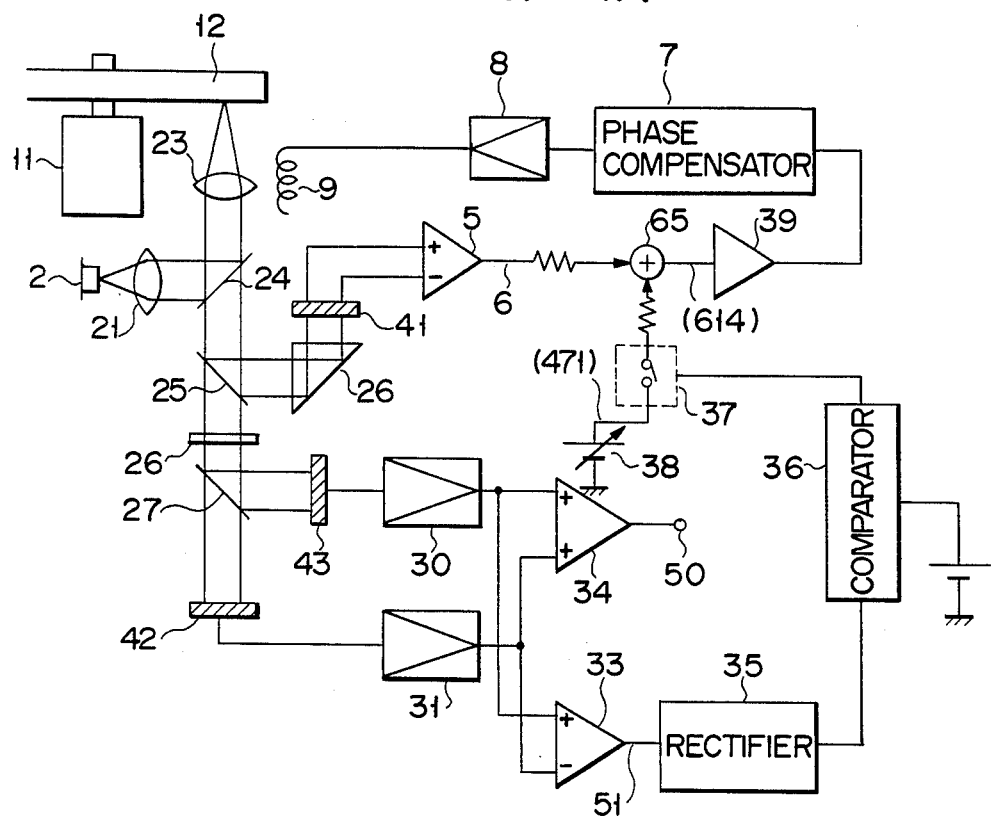
FIGS. 4(A) and 4(B) show the construction of the second embodiment according to this invention and illustrate its waveform.
Figure 4B:
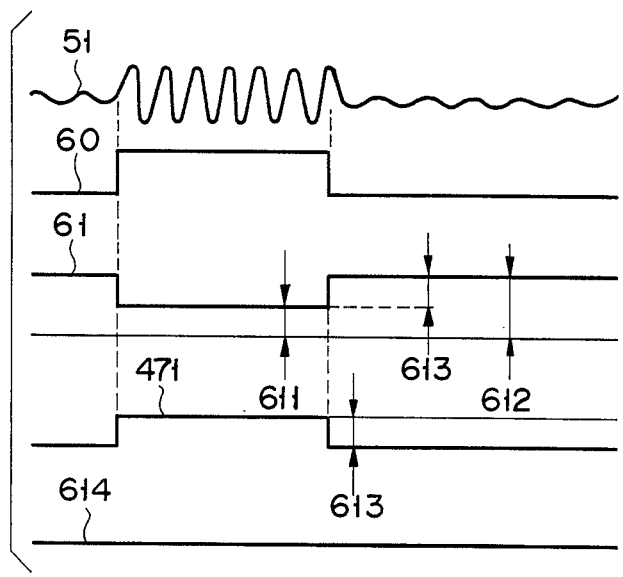

FIGS. 4(A) and 4(B) show the second embodiment according to this invention. FIG. 4(A) outlines the construction of an optical magnetic disc device according to this invention, and what it differs from the embodiment shown in FIG. 2(A) is that it has such a construction that differential output 51 which is the output from differential amplifier 33 is supplied to analog switch 37 via rectifier 35 and comparator 36, that is, the offset part of error signal (TES) 6 is compensated by differential output 51. FIG. 4(B) shows the waveforms illustrating the operation of the device in FIG. 4(A). Differential output 51 differs from the add output 50 in the first embodiment in that it has fine changes corresponding to the reproduced informations signals at the data part. In other respects, the second embodiment is almost similar to the first.

FIG. 5(A) shows the construction of the main parts of an optical information recording/reproducing apparatus as the third embodiment according to this invention. What it differs from the first embodiment in FIG. 2A is that the return beam detected by 2- to 4-split beam detector 41 is input to operation amplifier 55 to obtain total output 52 of split outputs. This total output 52 becomes output 60 after it passed through rectifier 35 and comparator 36. Since this output 60 produces different signal levels at the pre-format part and the data part, it can make the offset of error signal (TES) 6 compensated by analog switch 37. FIG. 5(B) shows typical waveforms explaining the operation of the third embodiment.

These embodiments have been explained assuming that the error signal is either track error signal (TES) or focus error signal (FES), but it is needless to say that they can be applied to both error signals at once.

According to this invention, the DC offset component is compensated by making the compensation signal overlap the error signal during the pre-format period in accordance with the substantial difference of the DC offset between the pre-format part and the data part, based on the electric signals obtained by detecting the return beam returned from the optical disc, and it is therefore capable of properly cancelling the offset at the pre-format part and the other part, and realizing accurate tracking control and/or focusing control at all times. As the result, this can greatly enhance the information processing stability and reliability in an optical information recording/reproducing apparatus. Further this invention is effective in both optical disc and optical magnetic disc, and so also applicable to an optical information recording/reproducing apparatus which can use both of these discs.

Furthermore, in the above described embodiments, the DC offset compensation signal is applied during the pre-format period, but it is needless to say that an inverted compensation signal may be applied other than during the pre-format period. Thereby offset component can also cancel.

What is claimed is:

1. An optical information-recording/reproducing apparatus with cancellation for an offset contained in an error signal, said apparatus comprising:
   beam-irradiation means for irradiating a beam to an optical information-recording medium having a pre-format portion containing an address signal and a data portion including an area in which information signals are to be recorded;
   reflected-beam detection means for producing an electric signal corresponding to a reflected beam from the optical-information recording medium irradiated by said beam-irradiation means;
   error-signal detection means for detecting an error signal for tracking control and/or focussing control of the beam, based on the electric signal from said reflected-beam detection means;
   information-signal detection means for detecting the information signal to be recorded in the data part of the optical information-recording medium, based on the electric signal from said reflected-beam detection means;
   pre-format portion detection means for detecting the pre-format portion of the optical information-recording medium, based on the electric signal from said reflected-beam detection means;
   offset-cancellation means for overlapping the error signal from the error-signal detection means and a compensation signal corresponding to the substantial difference of DC offset components between the data portion and the pre-format portion, detected by said pre-format detection means; and
   control means for controlling tracking and/or a focussing of the beam, based on a signal which is generated when the DC offset components contained in the error signal are compensated by said offset cancellation means.

2. An apparatus according to claim 1, wherein said information-signal detection means detects an information signal to be recorded in the data portion of said medium, based on two signals different from the electric signal used by said error-signal detection means.

3. An apparatus according to claim 2, wherein said pre-format portion detection means detects the pre-format portion, based on the add output between said two signals used by said information-signal detection means.

4. An apparatus according to claim 2, wherein said pre-format portion detection means detects the pre-format portion, based on the subtract output between said two signals used by said information-signal detection means.

5. An apparatus according to claim 2, wherein said pre-format portion detection means detects the pre-format portion, based on the same electric signal as used by said error-signal detection means.

* * * * *